United States Patent
Lokshin et al.

(10) Patent No.: US 7,233,860 B2
(45) Date of Patent: Jun. 19, 2007

(54) INTELLIGENT MODULAR NAVIGATION INFORMATION CAPABILITY

(75) Inventors: Anatole Lokshin, Claremont, CA (US); Sergey V. Portnov, Saint-Petersburg (RU); Yuriy A. Panov, Saint-Petersburg (RU)

(73) Assignee: Magellan Navigation, Inc., Santa Clara, CA (US)

( * ) Notice: Subject to any disclaimer, the term of this patent is extended or adjusted under 35 U.S.C. 154(b) by 338 days.

(21) Appl. No.: 10/619,619

(22) Filed: Jul. 16, 2003

(65) Prior Publication Data

US 2005/0015199 A1    Jan. 20, 2005

(51) Int. Cl.
*G01C 21/30*    (2006.01)
(52) U.S. Cl. ........................ 701/208; 701/209
(58) Field of Classification Search ........ 701/200–213; 342/357.01, 357.09, 357.1, 357.12, 357.13; 340/990, 995.1, 995.12–995.19, 995.28
See application file for complete search history.

(56) References Cited

U.S. PATENT DOCUMENTS

| | | | |
|---|---|---|---|
| 6,124,826 A | 9/2000 | Garthwaite et al. | |
| 6,125,326 A | 9/2000 | Ohmura et al. | |
| 6,184,823 B1 * | 2/2001 | Smith et al. | 342/357.13 |
| 6,253,151 B1 * | 6/2001 | Ohler et al. | 701/208 |
| 6,408,243 B1 * | 6/2002 | Yofu | 701/209 |
| 6,427,115 B1 * | 7/2002 | Sekiyama | 701/208 |
| 6,487,494 B2 * | 11/2002 | Odinak et al. | 701/202 |
| 6,671,617 B2 * | 12/2003 | Odinak et al. | 701/202 |
| 6,704,649 B2 * | 3/2004 | Miyahara | 701/208 |
| 6,728,636 B2 * | 4/2004 | Kokojima et al. | 701/211 |
| 6,819,301 B2 * | 11/2004 | Nagamatsu et al. | 343/850 |

FOREIGN PATENT DOCUMENTS

| | | |
|---|---|---|
| EP | 0 987 910 A | 3/2000 |
| WO | 00/74019 A | 12/2000 |
| WO | 02/37446 A | 5/2002 |

\* cited by examiner

*Primary Examiner*—Richard M. Camby
(74) *Attorney, Agent, or Firm*—Lowe Hauptman & Berner, LLP

(57) ABSTRACT

A navigation system for providing navigation information to a user responsive to user commands includes (1) a user device for issuing user commands and displaying a user interface to the user and (2) a navigation device for connecting to the user device and receiving user commands from the user device and transmitting navigation information to the user device. The information received from the user device includes updated map information, traffic information, news information, weather information, event-related information, business-related information, and user-specified information. The navigation device performs route following based on commands received from the user device and transmits routing instructions to the user device. The navigation device and user device are separately operable by a user.

29 Claims, 4 Drawing Sheets

INTELLIGENT MODULAR NAVIGATION INFORMATION CAPABILITY

FIELD OF THE INVENTION

The present invention relates to a method of and apparatus for providing navigation and other information to a user; and more particularly, the present invention relates to such a method and apparatus wherein the information provided to the user is generated based on differing data sources. Still more particularly, the present invention relates to a method and apparatus whereby a navigation device is connectable to a user device for interacting with a user.

BACKGROUND

There are two main types of vehicle navigation systems currently in use.

The first type of system includes a navigation-capable device, e.g. a GPS-based device, located in a vehicle which performs all required computations and contains all necessary navigation data. In this system, the navigation functions are restricted to the vehicle and can be performed anywhere in an area covered by navigation data stored in the device. A device according to this type of system requires a large amount of computational power, memory, and a large amount of map data storage.

Disadvantageously, there is no way to easily update frequently changing information, i.e. transitory information, stored in the system, e.g. restaurant names, traffic conditions/road conditions, construction projects, etc. Current in-vehicle navigation systems allow traffic information update using radio link information about traffic conditions at predetermined locations. Disadvantageously, this time critical information is not reconfigurable on-the-fly, the traffic information is only available for the predetermined points at the time of map creation. If the transitive information is stored in the system, data stored in data storage on the system requires complete replacement or update of the data. If only a small portion of the data changes or if the changes are frequent in nature, the replace/update process becomes tedious to a user. Further, if the user fails to update just prior to leaving for a destination and traffic conditions change, the user may be frustrated to encounter significant traffic delays.

The second type of system includes data and computational power hosted remote from the device. Smaller local maps and routing directions are then provided to the device over a network connection, e.g. a cellular telephone network, a system employing this type of architecture requires a powerful central server to perform route computation and a central database collocated with the server for storing map data. Disadvantageously, navigation capability, e.g. GPS, is required at the user device which further must be able to perform map matching or route following to display turn instructions at the correct time. Under this system, the primary objective is to move the additional cost and complexity required to perform navigation and store map data from a user device, e.g. a personal digital assistant (PDA) or a cellular telephone, to a central server. This trade-off allows for a simpler user device; however, transmission of server generated maps and routing increases the cost and bandwidth required.

Several additional disadvantages of such an approach include:

The cellular phone still requires the additional cost of a GPS or other navigational capability and must be capable of performing maps matching and route following computations;

Network capabilities and communication bandwidth can become swamped or overwhelmed if a large number of users require routing services at the same time, e.g. multiple requests from users for rerouting during rush-hour traffic; and The cellular phone must be in constant contact with the server in order to receive updated directions and information.

Based on the foregoing discussion, there is a need in the art for a third type of system able to perform complex computations, e.g. maps matching and route following, and store large amounts of maps data without being tied to a specific installation location and able to receive updates and other navigation information without requiring constant connection time and high bandwidth.

SUMMARY

It is therefore an object of the present invention to provide an improved navigation system able to provide navigation information, store map data, and receive updated information.

Another object of the present invention is to provide a portable navigation system providing navigation information without requiring constant connection time and high bandwidth.

A navigation system for providing navigation information to a user responsive to user commands includes (1) a user device for issuing user commands and displaying a user interface to the user and (2) a navigation device for connecting to the user device and receiving user commands from the user device and transmitting navigation information to the user device. The information received from the user device includes updated map information, traffic information, news information, weather information, event-related information, business-related information, and user-specified information. The navigation device performs route following based on commands received from the user device and transmits routing instructions to the user device. The navigation device and user device are separately operable by a user.

An apparatus aspect for providing navigation information to a user device responsive to commands received from the user device includes a navigation device adapted to be connected to the user device and receiving commands from the user device and transmitting navigation information to the user device. In a further embodiment, the user device receives information and transmits the information to the navigation device for combination with the navigation information. The user device received information includes transitory information such as updated map information, traffic information, news information, weather information, event-related information, business related information, and user-specified information.

Another apparatus aspect includes a navigation system for providing navigation information to a user responsive to user commands. The navigation system includes a user device for issuing user commands and displaying a user interface to the user and a navigation device connectable to the user device and able to receive user commands from the user device and transmit navigation information to the user device.

A method aspect of using a navigation system including a user device and a navigation device adapted to be connected to the user device includes establishing a connection between the navigation device and the user device. Navigation signals are received at the navigation device for determining the navigation system position. The user device is manipulated to command the navigation device to provide navigation information to the user device using the established connection. Responsive to commands received from the user device, the navigation device transmits navigation information to the user device using the established connection.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
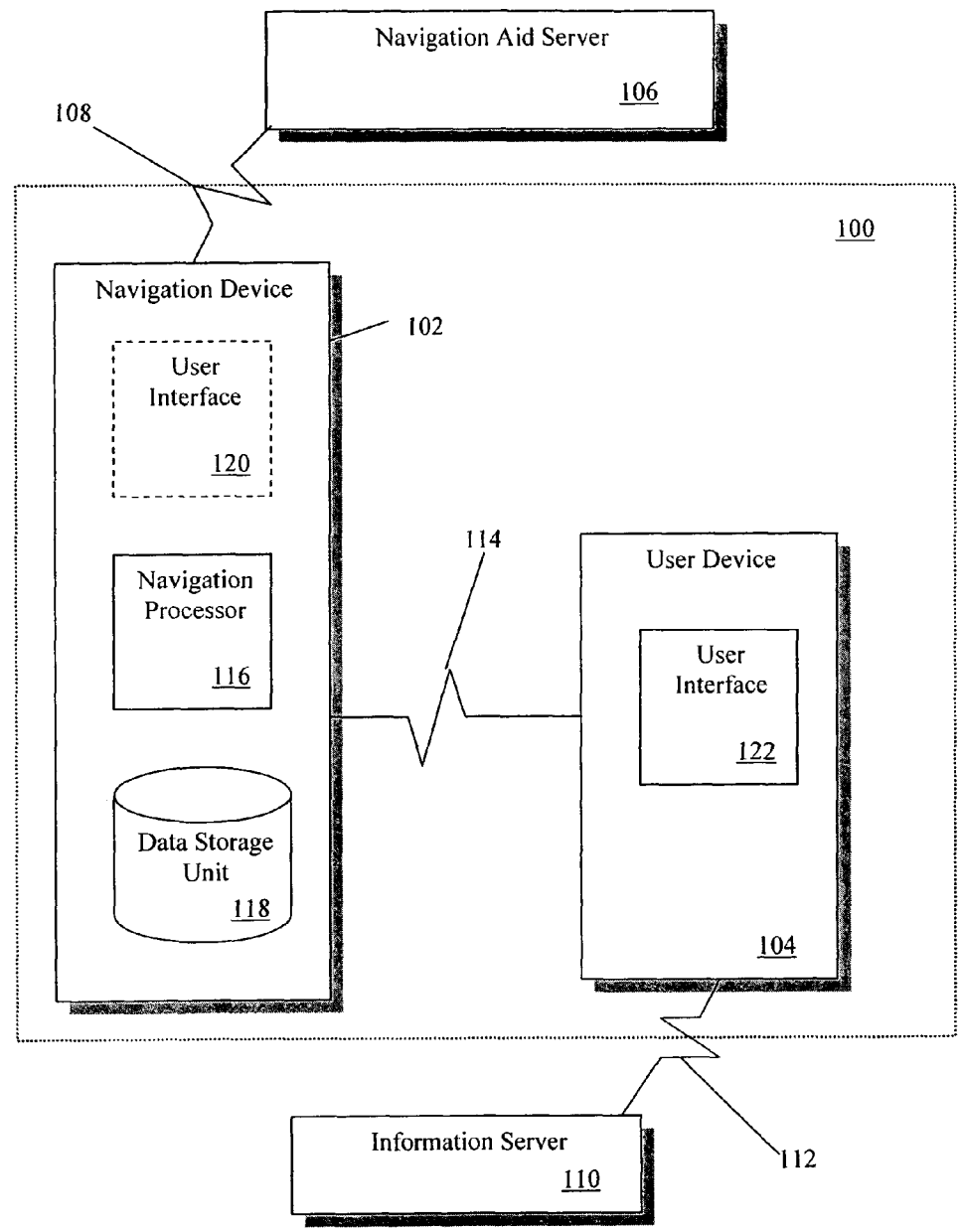
FIG. 1 is a high-level block diagram of a navigation system according to an embodiment of the present invention.

Recent developments in the field of computers, and more specifically in the areas of low-cost memory and increased processing capability, have enabled the creation of an additional system architecture for using a navigation device 102 (FIG. 1), e.g. a GPS receiver, in conjunction with a user device 104 (FIG. 1), e.g. a cellular telephone or a PDA, as part of a navigation system 100 (FIG. 1). Navigation Device 102 can also use sensors other than GPS, such as a magnetometer and accelerometer together with GPS for better map matching and position determination.

The computational processing required of the central server of the above-described system is now able to be made part of a low-cost navigation device capable of computing maps, performing routing, and other computation tasks necessary for vehicle and/or individual user routing. The navigation device 102 is further able to perform map matching and route following computations and provide this information to the connected user device 104.

In such a configuration, the user device 104, e.g. cellular telephone or PDA, is used only for interacting with the user, such as acting as a display or user interface terminal. As described below, navigation and other information and user commands may be transmitted between the navigation device 102 and the user device 104 via many different communication connections, e.g. short-range high-speed communication links such as serial connections or wireless connections, such as Bluetooth wireless technology or similar technologies. The user communicates with the navigation device 102 via the user device 104 or additional user interface devices, e.g. keyboard, keypad, and/or speech recognition capabilities.

There are several advantages of the above described system:

A user device can be used as a navigation system without requiring additional processing capability and storage on the user device;

The navigation device is not required to include the sometimes significant cost of the user interface system, e.g. requisite hardware and software capabilities;

Because the user device is connected between the navigation device and an information server, both local (navigation device-generated) and network (information server-generated) routing can be used depending on user preferences and/or data characteristics, e.g. freshness of data; and Route navigation can be performed in areas where the user device is unable to connect to the information server.

A high-level block diagram of the navigation system 100 according to an embodiment of the present invention is depicted in FIG. 1. Navigation system 100 includes two components capable of communicating with each other: a navigation device 102 and a user device 104. Navigation system 100 communicates with (1) a navigation aid server 106 using the navigation communication link 108 and (2) an information server 110 using an information communication link 112. Navigation device 102 and user device 104 communicate over a device communication link 114. A third communication device (not shown) connecting the user device 104 with a remote server, e.g. an information server 110, for obtaining time-sensitive routing and point-of-interest information on the time scale of the navigation device map update may be employed in a specific embodiment; however, it is to be understood that the user device includes the third communication device.

Navigation aid server 106 in a particular embodiment is a GPS satellite or pseudolite as is known in the art and navigation communication link 108 is a GPS signal broadcast by the GPS satellite or pseudolite. Depending on the location and configuration of navigation system 100, the navigation system may be in communication with more than one navigation aid server 106 via one or more navigation communication links 108. It is to be understood that although there may be more than one navigation aid server 106, for simplicity of explanation only a single navigation aid server will be discussed herein. It is to be further understood that although a GPS-based system is described, other navigation aid servers and navigation information providing servers may be used in conjunction with the present invention without departing from the spirit and scope of the invention. Further, although navigation communication link 108 is described herein as being a wireless connection, it is to be understood that a wired connection may be used in addition to or in place of a wireless connection.

Information server 110 in a particular embodiment is a wireless or cellular-based information providing computer system capable of communication with navigation system 100 over information communication link 112, e.g. a wireless application protocol (WAP)-based cellular telephone network connection. It will be understood by persons skilled in the art that navigation system 100 may be in communication with more than one information server 110 over more than one information communication link 112. Further, although information communication link 112 is described herein as being a wireless connection, it is to be understood that a wired connection may be used in addition to or in place of a wireless connection.

Information server 110 is able to provide frequently changing, i.e. transitory, information such as weather information, traffic information, news, etc. In a further detailed embodiment, information server 110 is able to provide area-wide business and/or user-defined interest information, e.g. restaurant specials, shopping sales, or cultural event information. For example, the user may manipulate user device 104 to specify information to be obtained from information server 110, e.g. to determine what current events are planned in a particular city in the next 24 hours. Depending on the bandwidth available and cost to the user, information communication link 112 may further be used to obtain updated map data and routing information.

Depending on the location and configuration of navigation system 100, the navigation system may be in communication with more than one information server 110 via one or more information communication links 112. It is to be understood that although there may be more than one information server 110, for simplicity of explanation only a single information server will be discussed herein. It is to be further understood that although a WAP-based system is described, other information servers and information providing servers may be used in conjunction with the present invention without departing from the spirit and scope of the invention. Further, although information communication link 112 is described herein as being a wireless connection, it is to be understood that a wired connection may be used in addition to or in place of a wireless connection.

Navigation device 102 includes a computer system which, based on signals received from navigation aid server 106 via a navigation interface 216 using navigation communication link 108, is able to determine device 102 position with reference to navigation aid server 106, as is known to persons skilled in the art. Navigation device 102 includes (1) a navigation processor 116 for determining position of device 102 and performing other navigation functions, e.g. map matching and route following calculations, and (2) a data storage unit 118 for storing map data, route data, position data, and other variables and information. Optionally, in a particular embodiment navigation device 102 may include a user interface 120 (dashed line) for displaying information to and receiving commands from a user.

Figure 2:
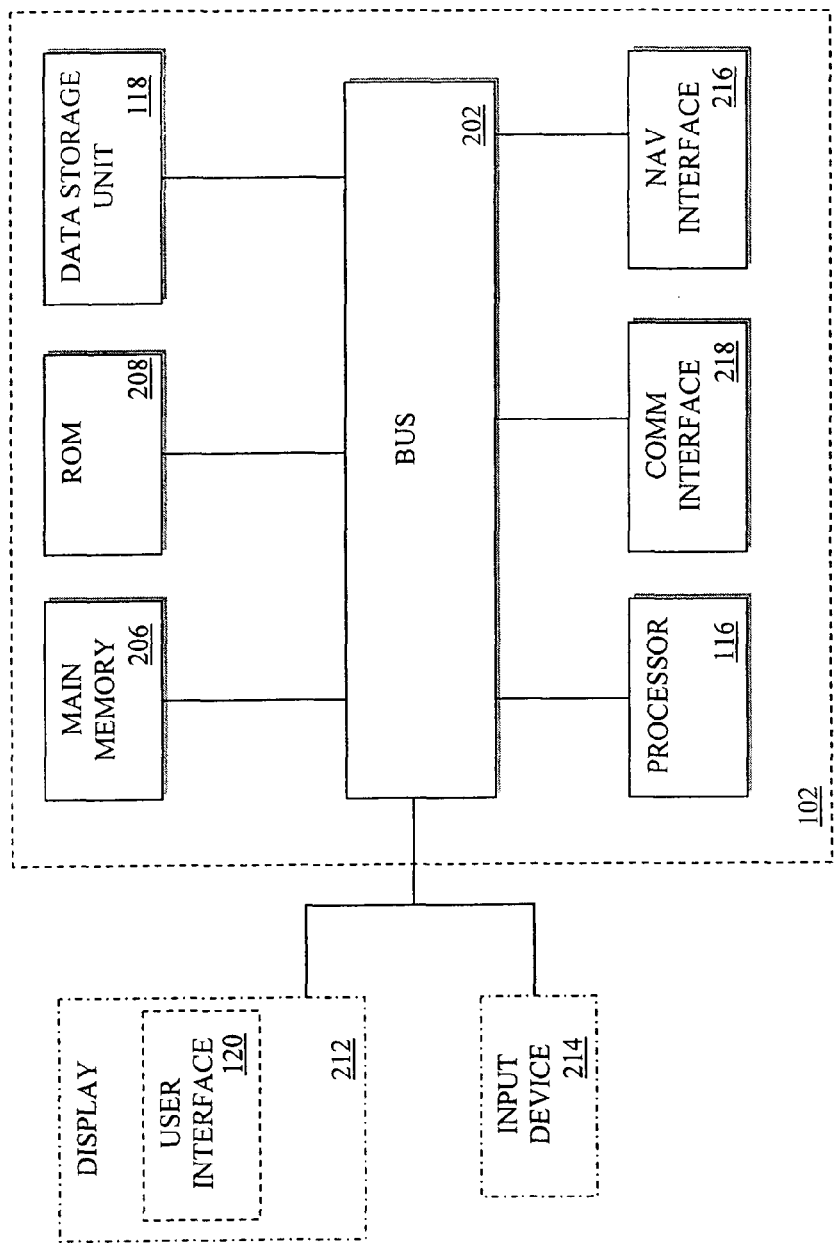
FIG. 2 is a high-level block diagram of a computer system on which a navigation device of the navigation system of FIG. 1 may be implemented according to an embodiment of the present invention.

A high-level block diagram of a computer system on which an embodiment of navigation device 102 may be implemented is depicted in FIG. 2. Navigation device 102 includes a bus 202 or other communication mechanism for communicating information, and a processor 116 coupled with the bus 202 for processing information. Navigation device 102 also includes a main memory 206, such as a random access memory (RAM) or other dynamic storage device, coupled to the bus 202 for storing navigation information, e.g. map data, and transitory information obtained from user device 104, e.g. traffic information, according to an embodiment of the present invention and instructions to be executed by processor 116. The navigation information includes information that does not change as often as the transitory information, e.g. changes occur once every six months, a year, or greater. Typical navigation information includes topographic information, geographic information, and roadway or route information. Main memory 206 also may be used for storing temporary variables or other intermediate information during execution of instructions to be executed by processor 116. Navigation device 102 further includes a read only memory (ROM) 208 or other static storage device coupled to the bus 202 for storing static information and instructions for the processor 116. A data storage unit 118, such as a magnetic disk, optical disk, or other storage device, e.g. compact flash, smart media, or other storage device, is optionally provided and coupled to the bus 202 for storing instructions, navigation information, and transitory information. Additional stored information can include acceleration, temperature, pressure, and information from magneto sensors in order to assist the navigation device 102, e.g. GPS, in map matching and position determination.

Navigation device 102 may be coupled via the bus 202 to a display 212, such as a flat panel touch-sensitive display connected as an integral piece of the navigation device, for displaying an interface to a user. An optional input device 214 (dash dot line), such as a keyboard including alphanumeric and function keys and/or a cursor control, is optionally coupled to the bus 202 for communicating information and command selections to the processor 116. As is known in the art, cursor control may include devices such as a stylus, pen, mouse, a trackball, or cursor direction keys for communicating direction information and command selections to processor 116 and for controlling cursor movement on the display 212. This type of input device typically has two degrees of freedom in two axes, a first axis (e.g., x) and a second axis (e.g., y) allowing the device to specify positions in a plane.

The invention is related to the use of navigation device 102, such as the depicted computer system of FIG. 2, to store and access data, e.g. navigation information and transitory information. According to one embodiment of the invention, data is stored and accessed by navigation device 102 in response to processor 116 executing sequences of instructions contained in main memory 206 in response to input received via input device 214 or a communication interface 218 using communication link 114. Such instructions may be read into main memory 206 from another computer-readable medium, such as data storage unit 118. A user interacts with the data via either a user interface 120 displayed on display 212 of navigation device 102 or via a user interface 122 displayed on user device 104 described in detail below.

However, the computer-readable medium is not limited to devices such as data storage unit 118. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an erasable PROM (EPROM), a Flash-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 116 to perform the process steps described below. In alternative embodiments, hard-wired circuitry may be used in place of or in combination with computer software instructions to implement the invention. Thus, embodiments of the invention are not limited to any specific combination of hardware circuitry and software.

Navigation device 102 also includes a communication interface 218 coupled to the bus 202 and providing two-way data communication using communication link 114 as is known in the art. For example, communication interface 218 may be a wired or wireless interface connection to provide a data communication connection between navigation device 102 and user device 104. As another example, communication interface 218 may be a local area network (LAN) card to provide a data communication connection to a compatible LAN. Wireless links may also be implemented. In any such implementation, communication interface 218 sends and receives electrical, electromagnetic or optical signals which carry digital data streams representing various types of information. Of particular note, the communications through interface 218 may permit transmission or receipt of instructions and data to be stored and accessed.

Navigation device 102 can send messages and receive data, including program code, through communication interface 218 using communication link 114 with user device 104. The received code may be executed by processor 116 as it is received, and/or stored in data storage unit 118, or other non-volatile storage for later execution. In this manner, navigation device 102 may obtain application code, navigation information, and transitory information in the form of a carrier wave.

User device 104, e.g. a cellular telephone or a PDA, is a communication and/or information device usable by the user to receive: (1) information from information server 110 via an information communication interface using information communication link 112 and (2) navigation information from navigation device 102 via a communication interface 316 using device communication link 114. Further, user device 104 is usable by a user to command navigation device 102 and to request information from information server 110. User device 104 is typically small, lightweight and portable, and able to be easily carried on the person. As is known in the art, user device 104 includes a processor 304 and a memory 306 (FIG. 3) enabling processing and storage of information, respectively.

Figure 3:
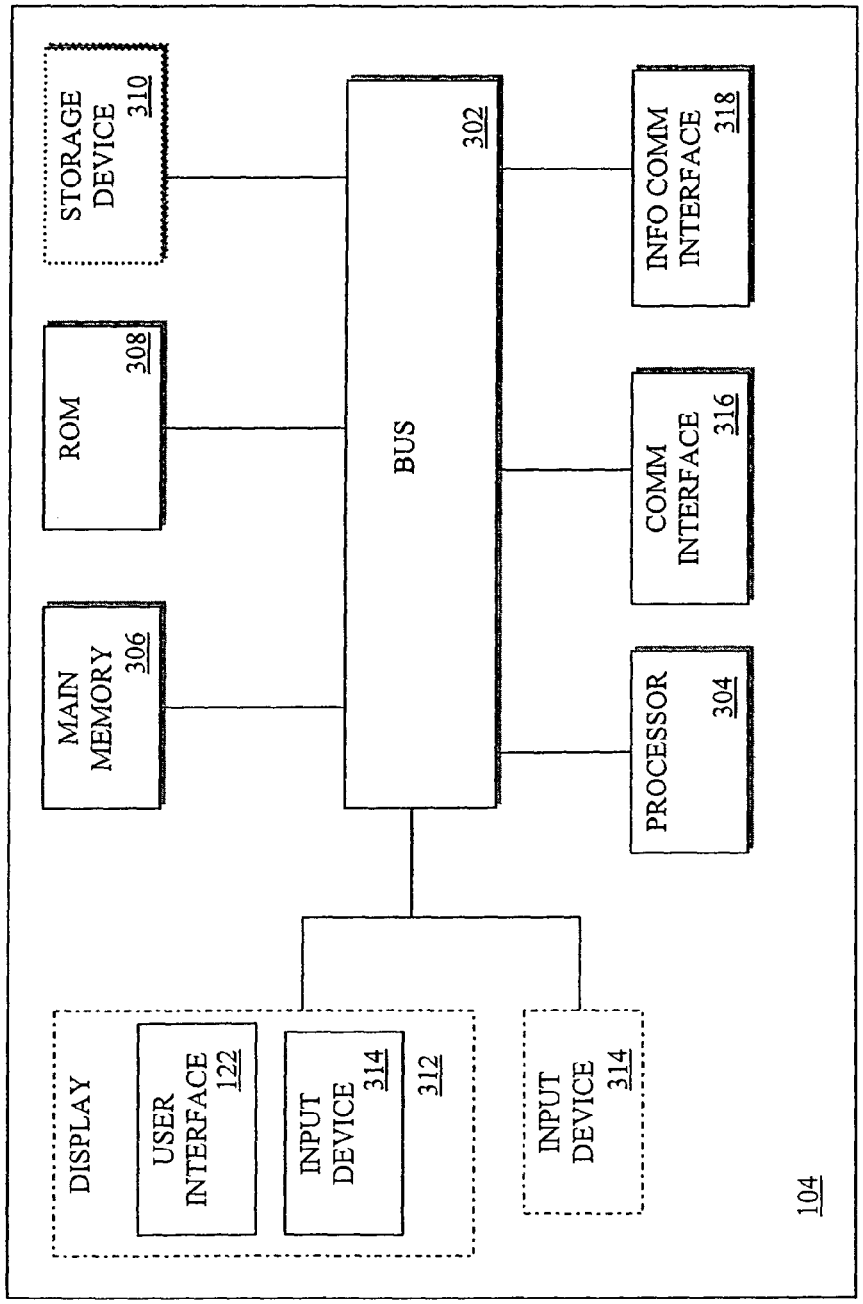
FIG. 3 is a high-level block diagram of a computer system on which a user device of the navigation system of FIG. 1 may be implemented according to an embodiment of the present invention.

A high-level block diagram of a user device including a computer system on which an embodiment of user device 104 may be implemented is depicted in FIG. 3.

FIG. 3 is a block diagram illustrating an exemplary computer or user device 104, e.g. a handheld device such as a portable telephone or PDA, upon which an embodiment of the invention may be implemented. The present invention is usable with currently available handheld and embedded devices, and is also applicable to personal computers and the like.

User device 104 includes a bus 302 or other communication mechanism for communicating information, and a processor 304 coupled with the bus 302 for processing information. User device 104 also includes a main memory 306, such as a random access memory (RAM) or other dynamic storage device, coupled to the bus 302 for storing user information and transitory information according to an embodiment of the present invention and instructions to be executed by processor 304. Main memory 306 also may be used for storing temporary variables or other intermediate information during execution of instructions to be executed by processor 304. User device 104 further includes a read only memory (ROM) 308 or other static storage device coupled to the bus 302 for storing static information and instructions for the processor 304. A storage device 310 (dotted line), such as a compact flash, smart media, or other storage device, is optionally provided and coupled to the bus 302 for storing instructions.

User device 104 may be coupled via the bus 302 to an optional display 312 for displaying a user interface 122 to a user. In order to reduce space requirements for handheld devices, the display 312 typically includes the ability to receive input from an input device 314, such as a stylus, in the form of user manipulation of the input device 314 on a sensing surface of the display 312. Optionally, input device 314 (dash dot line), such as a keyboard including alphanumeric and function keys, is optionally coupled directly to the bus 302 for communicating information and command selections to the processor 304. User input device 314 may include a cursor control, such as a stylus, pen, mouse, a trackball, or cursor direction keys for communicating direction information and command selections to processor 304 and for controlling cursor movement on the display 312. The input device 314 typically has two degrees of freedom in two axes, a first axis (e.g., x) and a second axis (e.g., y) allowing the device to specify positions in a plane.

The invention is related to the use of user device 104, such as the depicted computer of FIG. 3, to present navigation information to a user. According to one embodiment of the invention, data is stored and accessed from an information server 110 and navigation device 102 by user device 104 in response to processor 304 executing sequences of instructions contained in main memory 306 in response to input received via display 312. Such instructions may be read into main memory 306 from another computer-readable medium, such as optional storage device 310. A user interacts with the user device 104 by the user interface 122 displayed on display 312.

However, the computer-readable medium is not limited to devices such as optional storage device 310. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an erasable PROM (EPROM), a Flash-EPROM, any other memory chip or cartridge, a carrier wave embodied in an electrical, electromagnetic, infrared, or optical signal, or any other medium from which a computer can read. Execution of the sequences of instructions contained in the main memory 306 causes the processor 304 to perform the process steps described below. In alternative embodiments, hard-wired circuitry may be used in place of or in combination with computer software instructions to implement the invention. Thus, embodiments of the invention are not limited to any specific combination of hardware circuitry and software.

User device 104 also includes a communication interface 316 coupled to the bus 302 and providing two-way data communication using device communication link 114 as is known in the art. For example, communication interface 316 may be a wired or wireless connection to provide a data communication connection between navigation device 102 and user device 104. As another example, communication interface 316 may be a local area network (LAN) card to provide a data communication connection to a compatible LAN. Wireless links may also be implemented. In any such implementation, communication interface 316 sends and receives electrical, electromagnetic or optical signals which carry digital data streams representing various types of information. Of particular note, the communications through interface 316 may permit transmission or receipt of instructions and data to be stored and accessed.

User device 104 further includes a information communication interface 318 coupled to the bus 302 and providing two-way data communication using information communication link 112 as is known in the art. For example, information communication interface 318 may be a wired or wireless connection to provide a data communication connection between user device 104 and information server 110. Wireless links may also be implemented. In any such implementation, information communication interface 318 sends and receives electrical, electromagnetic or optical signals which carry digital data streams representing various types of information. Of particular note, the communications through interface 318 may permit transmission or receipt of instructions and data to be stored and accessed.

Device communication link 114 may be either a wireless or wired connection. In one particular embodiment, device communication link 114 is a radio frequency (RF) wireless communication link using the Bluetooth protocol for communication between navigation device 102 and user device 104. In another particular embodiment, device communication link 114 is a serial, wired communication link using a serial protocol for communication between navigation device 102 and user device 104.

Figure 4:
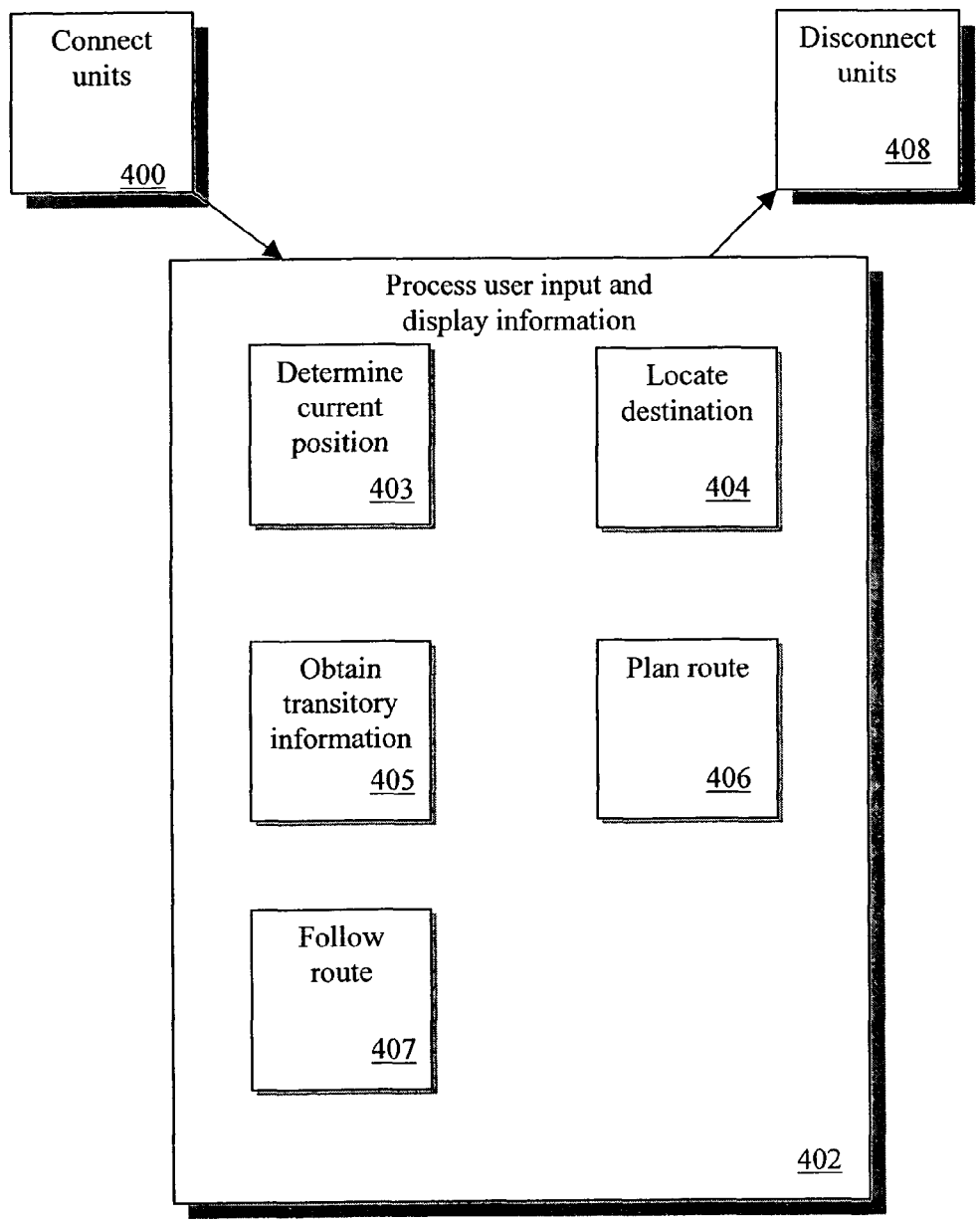
FIG. 4 is a high-level block diagram of processes executed by an embodiment of the present invention in operation.

A description of the operation of an embodiment of the present invention is now provided with reference to a high level function diagram depicted in FIG. 4. In process step 400, a user places a user device 104 connected to or proximate to a navigation device 102 such that a device communication link 114 is established between the user device and the navigation device. The combined user device and navigation device make up a navigation system 100 as shown in FIG. 1 and described in detail above.

The next step in user operation of navigation system 100 is step 402 wherein user input at user device 104 is communicated to navigation device 102 and navigation information is communicated from navigation device 102 to user device 104 and displayed to the user. Step 402 includes five additional processes 403–407 for providing different functionality to the user. Process 403, executed by navigation processor 116, uses navigation signals received via navigation communication link 108 to determine the current position of the navigation system 100.

Process 404, executed by navigation processor 116, accesses navigation information stored in memory 206 or optionally data storage unit 118 to determine the position of a user designated destination. Further, in a particular embodiment, the position information for a user destination may be obtainable from transitory information available from information server 110 via information communication interface 318 of user device 104. For example, a new restaurant, weather information, or a current event not stored in memory 206 may be found in memory 306 of user device 104 based on transitory information obtained from an information server 110 according to a below described process 405.

Process 405, executed by processor 304 of user device 104, uses information communication interface 318 of user device 104 to communicate with information server 110 to obtain transitory information. The obtained transitory information includes navigation and other information which changes on a more frequent basis than the navigation information stored in navigation device 102. For example, traffic information, current event information, and other hourly, daily, weekly, or monthly changing information. Typically, a large amount of transitory information changes frequently, e.g. every day, preventing the constant update of the stored information in navigation system 100.

Process 406, executed by navigation processor 116, uses navigation information from navigation device 102 and transitory information from user device 104 to determine a route from the current system position (process 403) to the destination (process 404). Routes may be determined based on different criteria, e.g. shortest distance, fastest time, mostly highway travel, mostly surface street travel.

Process 407, executed by navigation processor 116, uses the route output from process 406 and an updated determination of current system position (process 403) to provide instructions to the user indicating the route to follow to reach the destination identified in process 404. While following the route (process 407), additional updated transitory information may be obtained in order to modify the route being used to reach a destination.

In process 408, the navigation device and the user device are separated removing the device communication link 114. User device 104 is then usable as a user device, e.g. a telephone or PDA, and navigation device 102 is usable as a navigation device, e.g. a GPS receiver.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An apparatus installable in a vehicle for providing navigation information to a user device responsive to commands received from the user device comprising:
   a navigation device adapted for connecting to the user device and receiving commands from the user device and transmitting navigation information to the user device wherein said user device is removable and transportable from the vehicle and wherein the navigation device is arranged to perform map matching.

2. The apparatus as claimed in claim 1 wherein the navigation device is adapted for receiving information from the user device and receiving navigation signals from a navigation aid server.

3. The apparatus as claimed in claim 2 wherein the information received from the user device includes at least one of updated map information, traffic information, news information, weather information, event-related information, business-related information, and user-specified information.

4. The apparatus as claimed in claim 2 wherein the navigation device is arranged to combine the navigation information and the information from the user device and communicate the combined information to the user device.

5. The apparatus as claimed in claim 1 wherein the navigation device is a GPS receiver.

6. The apparatus as claimed in claim 1 wherein the navigation device is arranged to perform map matching and transmit matched maps to the user device.

7. The apparatus as claimed in claim 1 wherein the navigation device is adapted to perform route following based on commands received from the user device and to transmit routing instructions to the user device.

8. The apparatus as claimed in claim 1 wherein the navigation device includes a user interface adapted for interaction with a user to receive user commands and transmit navigation information to the user.

9. A navigation system for installation in a vehicle for providing navigation information to a user responsive to user commands comprising:

a user device for issuing user commands and displaying a user interface to the user, wherein said user device is removable and transportable from the vehicle;

a navigation device adapted for connecting to the user device and receiving user commands from the user device and transmitting navigation information to the user device, wherein the navigation device is arranged to perform map matching.

10. The navigation system of claim 9 wherein the user device user interface includes a display and an input device.

11. The navigation system of claim 10 wherein the input device includes at least one of a keypad, a keyboard, a cursor control, a pointing device, and sound-controlled input.

12. The navigation system of claim 9 wherein the navigation device is adapted for receiving information from the user device.

13. The navigation system of claim 9 wherein the information received from the user device includes at least one of updated map information, traffic information, news information, weather information, event-related information, business-related information, and user-specified information.

14. The navigation system of claim 9 wherein the navigation device is a GPS receiver.

15. The navigation system of claim 9 wherein the navigation device is adapted to perform route following based on commands received from the user device and transmit routing instructions to the user device.

16. The navigation system of claim 15 wherein the navigation device is adapted to update routing instructions as a function of additional information received from the user device.

17. A method of using a navigation system installed in a vehicle including a user device and a navigation device adapted for connecting to the user device comprising the steps of:

establishing a connection between the navigation device and the user device;

manipulating the user device to command the navigation device to provide navigation information using the established connection wherein the user device is removable and transportable from the vehicle;

receiving navigation signals at the navigation device for determining the navigation system position; and responsive to commands from the user device, performing map matching at the navigation device and transmitting navigation information from the navigation device to the user device using the established connection.

18. The method of claim 17 wherein the user device includes at least one of a telephone and a personal digital assistant.

19. The method of claim 17 further comprising the steps of:

receiving information signals including information at the user device and transmitting the user device received information to the navigation device using the established connection; and combining the user device received information with the navigation information at the navigation device to produce updated navigation information.

20. The method of claim 19 wherein the user device received information includes at least one of updated map information, traffic information, news information, weather information, event-related information, business-related information, and user-specified information.

21. The apparatus of claim 1, wherein said user device is a handheld device.

22. The apparatus of claim 21, wherein said handheld device is one of a portable and a PDA.

23. The system of claim 9, wherein said user device is a handheld device.

24. The system of claim 23, wherein said handheld device is one of a portable and a PDA.

25. The apparatus of claim 1, wherein the navigation device is arranged to perform routing responsive to commands received from the user device.

26. The apparatus of claim 25, wherein the navigation device is arranged to perform routing based on navigation information generated at the navigation device.

27. The apparatus of claim 25, wherein the navigation device is arranged to perform routing based on navigation information received from the user device.

28. The system of claim 9, wherein the navigation device is arranged to perform routing responsive to commands received from the user device.

29. The method of claim 17, further comprising performing routing by the navigation device responsive to commands from the user device.

* * * * *